No. 831,078. PATENTED SEPT. 18, 1906.
F. JOTTRAND.
METHOD OF CUTTING PLATES, PIPES, &c.
APPLICATION FILED AUG. 22, 1905.

Witnesses:
May Bird.
William Dorman Jr.

Inventor:
Felix Jottrand.
by Rosenbaum & Stockbridge.
Attys.

UNITED STATES PATENT OFFICE.

FELIX JOTTRAND, OF UCCLE, BELGIUM.

METHOD OF CUTTING PLATES, PIPES, &c.

No. 831,078.　　　Specification of Letters Patent.　　　Patented Sept. 18, 1906.

Application filed August 22, 1905. Serial No. 275,207.

*To all whom it may concern:*

Be it known that I, FELIX JOTTRAND, engineer, a subject of the King of Belgium, residing at Uccle, near Brussels, in the Kingdom of Belgium, have invented new and useful Improvements in a Method of Cutting Plates, Pipes, and other Metal Articles, of which the following is a specification.

This invention has reference to a method of cutting plates, pipes, and other metal articles; and it has for its object to enable such articles, particularly those of iron or other readily-oxidizable metal, to be cut almost instantaneously.

The method consists, broadly, in heating the object to be cut along the line of section by means of a blowpipe of any appropriate kind—such as an oxyhydrogen, oxyacetylene, or analogous blowpipe—and to simultaneously direct upon the said line at a certain distance from the jet of the heating-blowpipe a jet of oxygen under pressure to effect the cutting of the object by chemical action upon the heated part, the metal being raised to such a temperature as to enable oxidation to take place rapidly without fusion of the metal, while the oxids, which are more fusible than the metal itself, flow readily and the severance is perfectly clean, as though the metal had been sawed.

In practice the process may be carried out in different manners and by means of different appliances—for example, by means of an ordinary oxyhydrogen-blowpipe having a second nozzle arranged and regulated appropriately in relation to its heating-nozzle.

Figure 1:
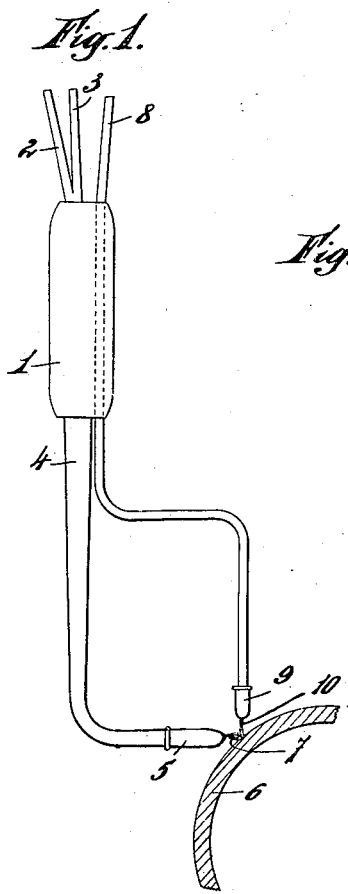
Figure 2:
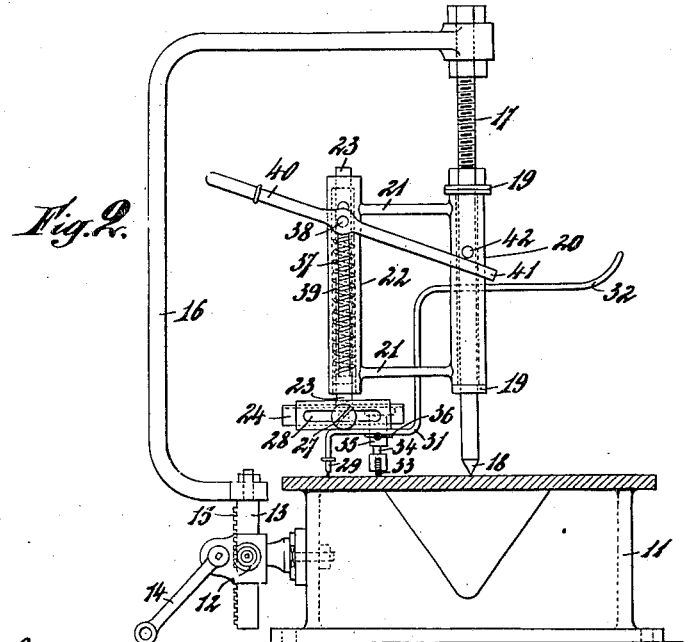
Figure 3:
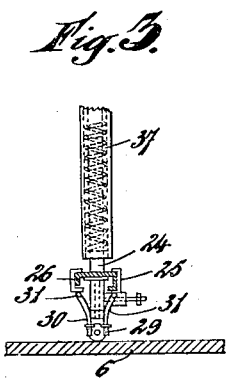
Figure 4:
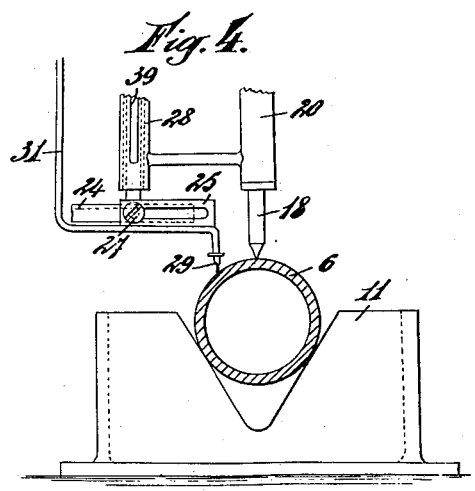

In the annexed drawings, Figure 1 shows a blowpipe adapted to carry the process into practice. Figs. 2, 3, and 4 show an apparatus particularly adapted to cut orifices or holes of a regular contour. Fig. 2 is a side view of the apparatus. Fig. 3 shows a detail, and Fig. 4 shows the apparatus used for cutting a hole in a pipe.

When the work does not require any great amount of precision or when the contours to be cut are relatively complicated, an ordinary blowpipe 1, Fig. 1, may be employed provided with separate inlets 2 3 for the oxygen and hydrogen opening into a mixing-chamber 4, provided with a nozzle 5, directing a heating-jet 7 upon the object 6 which it is desired to cut. To this blowpipe 1 is fixed a special conduit 8, conducting oxygen under pressure to a nozzle 9, arranged and regulated relatively to the heating-nozzle in such a manner as to direct a jet 10 of oxygen to the point which has been raised to the proper temperature by the heating-flame 7. This jet of oxygen consequently cuts said object without producing a seam without appreciable loss of metal along a perfectly regular line, it being only necessary to cause the blowpipe-nozzles to follow the contour to be cut.

In cases in which it is desired to cut orifices or holes of a regular contour—as, for example, of circular form—I may employ apparatus comprising a frame 11, upon which the object 6 to be cut is placed, Figs. 2 to 4. To this frame is secured laterally a support 12, through which passes a rod 13, the height of which may be altered at will by means of a small pinion, actuated by a crank 14 and engaging in a rack 15, cut in said rod 13. This rod 13 carries on an arm 16 an adjustable screw-threaded rod 17, terminating in a center point 18, intended to rest upon the article to be treated and to determine the center of the orifice to be cut. Upon this rod 17 is mounted a tube 20, freely rotatable between two collars 19 and having arms 21 carrying a tube 22, through which passes a rod 23, carrying at its lower part a support 24, upon the sides of which are two slidable plates 25 26, whose position upon said support 24 can be fixed by set-screws 27, passing through slots 28. One of the plates 25 carries the heating-nozzle 29 and the other, 26, the cold or oxygen nozzle 30, said nozzles being fixed to the ends of metal pipes 31, connected with flexible tubes 32, one of which supplies the mixture of oxygen and hydrogen to the heating-nozzle 29 and the other the oxygen to the cold nozzle 30.

The aforesaid support 24 may be provided with a guide-roller 33, carried by a rod 34, entering a guide 35, fixed to the support 24, the position of this roller 33 being regulated by a set-screw 36, acting upon the rod 34, that carries the guide-roller.

The rod 23, that carries the said support 24, is subjected to the action of a spring 37, which tends to lift it, and is also provided with a pin 38, sliding in longitudinal grooves 39 of the tube 22. The pin 37 carries a rocking lever 40, the free end 41 of which engages beneath a pin 42, fixed upon the aforesaid rotatable tube 20 in such a manner that it is only necessary to exert pressure upon the rocking lever 40 to depress the supporting-rod 23 in opposition to its spring, and thus cause the roller 33 to rest on the object which is to be cut. The apparatus as a whole is then able to rotate around the screw-threaded rod 17 while the roller 33 travels over the work 6. It is thus only necessary to regulate the position of the slidable plate 25 26 relatively to the center of the orifice to be cut in order to exactly fix the radius of said orifice. The distance of the nozzles 29 30 from the work may be exactly regulated by adjusting the height of the roller. The apparatus being ready to operate and the supporting-rod 23 being depressed by its lever 40 in such manner as to cause the roller 33 to rest upon the work, it is only necessary to cause the apparatus as a whole to rotate slowly around the screw-threaded rod 17 and cause the nozzles to describe a circle around the point 18 in order to cut uniformly a circle of the desired diameter.

The apparatus lends itself to operations of all kinds, the position of the nozzles 29 30 being capable of adjustment at will by the simple displacement of the slidable plates 25 26.

The lifting and lowering of the nozzles 29 30 permit of effecting the cutting not only in one and the same horizontal plane, but also in any given direction—as, for example, when cutting holes in tubes and shaping ends of tubes to correspond with such openings. Fig. 4 shows the use of the apparatus for cutting a hole in a pipe or tube. In such case the tube 6 would be placed in the recess in the frame 11 and support the center point 18, the blowpipes rotating around this point 18 and being raised and lowered at the proper moment in the way above indicated.

Having thus described my invention, what I claim is—

1. The method of cutting plates, pipes and other metal articles consisting in heating the object to be cut and directing upon the heated part an oxidizing-jet.

2. The method of cutting plates, pipes and other metal articles consisting in directing upon the object to be cut a suitable heating-jet and an independent oxidizing-jet.

3. The method of cutting plates, pipes and other metal articles consisting in directing a heating-jet upon the object to be cut, upon the line of section and an independent oxidizing-jet at a distance from the heating-jet and displacing both jets along the line of section.

4. The method of cutting plates, pipes and other metal articles consisting in directing a heating-jet upon the object to be cut, along the line of section so as to raise the metal to a temperature enabling oxidation without fusion of the metal and in directing simultaneously upon the heated part of the object a jet of oxygen under pressure.

5. The method of cutting plates, pipes and other metal articles consisting in directing a heating-jet upon the object to be cut, along the line of section so as to raise the metal to a temperature enabling oxidation without fusion of the metal, in directing simultaneously a jet of oxygen under pressure upon the heated part of the object and in moving simultaneously both jets along the line of section.

In testimony whereof I have signed my name to this specification in the presence of two subscribing witnesses.

FELIX JOTTRAND.

Witnesses:
MAURICE GERBEAULT,
GREGORY PHELAN.